US012592372B2

(12) United States Patent
Newton et al.

(10) Patent No.: US 12,592,372 B2
(45) Date of Patent: Mar. 31, 2026

(54) ION FUNNEL-BASED COLLISION CELL

(71) Applicant: AGILENT TECHNOLOGIES, INC., Santa Clara, CA (US)

(72) Inventors: Kenneth R. Newton, Santa Clara, CA (US); Tong Chen, Santa Clara, CA (US); Stephen Zanon, Santa Clara, CA (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 461 days.

(21) Appl. No.: 18/345,744

(22) Filed: Jun. 30, 2023

(65) Prior Publication Data

US 2024/0038520 A1 Feb. 1, 2024

Related U.S. Application Data

(60) Provisional application No. 63/393,468, filed on Jul. 29, 2022.

(51) Int. Cl.
*H01J 49/06* (2006.01)
*H01J 49/04* (2006.01)

(52) U.S. Cl.
CPC ........ *H01J 49/066* (2013.01); *H01J 49/0481* (2013.01)

(58) Field of Classification Search
CPC .............................. H01J 49/066; H01J 49/081
See application file for complete search history.

(56) References Cited

U.S. PATENT DOCUMENTS 12,154,779 B2 * 11/2024 Cooks .................. H01J 49/429
2005/0258364 A1 * 11/2005 Whitehouse ............ H01J 49/42 250/283
2009/0242747 A1 10/2009 Guckenberger et al.
2010/0301210 A1 12/2010 Bertsch et al.
2015/0108347 A1 * 4/2015 Vidal de Miguel . G01N 27/623 250/288
2015/0233866 A1 8/2015 Verenchikov
(Continued)

FOREIGN PATENT DOCUMENTS

CN 113471054 A 10/2021
JP 2001522514 A 11/2001
WO 2019235806 A1 12/2019

OTHER PUBLICATIONS

International Search Report and Written Opinion for Application No. PCT/US2023/024458, mailed Sep. 21, 2023, 7 pages.
(Continued)

*Primary Examiner* — Nicole M Ippolito

(57) ABSTRACT

In some examples, an ion funnel-based collision cell may include an ion funnel entrance section formed by a plurality of adjacently disposed entrance members. Each entrance member of at least one pair of the adjacently disposed entrance members may include a successively larger opening to form a tapered or profiled entrance for ions entering the ion funnel-based collision cell. An insulation material may be disposed adjacent to or in contact with each entrance member of the at least one pair of the adjacently disposed entrance members to prevent, outside of each successively larger opening, flow of gas between each entrance member of the at least one pair of the adjacently disposed entrance members.

20 Claims, 9 Drawing Sheets

(56) References Cited

U.S. PATENT DOCUMENTS

| | | | |
|---|---|---|---|
| 2017/0059525 | A1 | 3/2017 | Giles et al. |
| 2019/0074170 | A1 | 3/2019 | Doroshenko et al. |
| 2021/0398791 | A1 | 12/2021 | Silveira et al. |
| 2022/0163481 | A1 | 5/2022 | Hopkins et al. |
| 2024/0175846 | A1* | 5/2024 | Covey .................. G01N 27/624 |
| 2024/0319054 | A1* | 9/2024 | Benner ................. H01J 49/167 |

OTHER PUBLICATIONS

International Search Report and Written Opinion for Application No. PCT/US2023/024463, mailed Sep. 21, 2023, 6 pages.

* cited by examiner

ION FUNNEL-BASED COLLISION CELL

PRIORITY

This application claims priority to commonly assigned and Provisional Application Ser. No. 63/393,468, filed Jul. 29, 2022, titled "ION FUNNEL-BASED COLLISION CELL", the disclosure of which is hereby incorporated by reference in its entirety.

BACKGROUND

An ion funnel may be a device that is used within a mass spectrometer system to collect ions. In one example, the ion funnel may include a relatively large entrance diameter and transport ions to an exit with a relatively small exit diameter. In one type of ion funnel, a set of stacked (e.g., parallel) plates may include an opening in each plate, and the openings may be aligned along a central axis.

During operation of the mass spectrometer system, ions may enter through the relatively large diameter entrance and exit through the relatively small diameter exit. The ions may be moved forward from the entrance to the exit by means of an axial electric field. The axial electric field may be created by setting direct current (DC) potentials of each plate to form a downhill potential drop from entrance to exit. Ions may be prevented from striking walls of the ion funnel, for example, at a ring diameter or at each plate, by applying alternate phase radio frequency (RF) voltage to the plates. In one example, the RF and DC voltages may be distributed to the set of plates with a resistor and capacitor ladder from a pair of RF inputs and a pair of DC inputs.

In some cases, ions may be cooled within the ion funnel by colliding with a background gas such as nitrogen. The background gas may assist in gathering ions with relatively large input energies to deliver ions at the exit with a relatively low energy.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
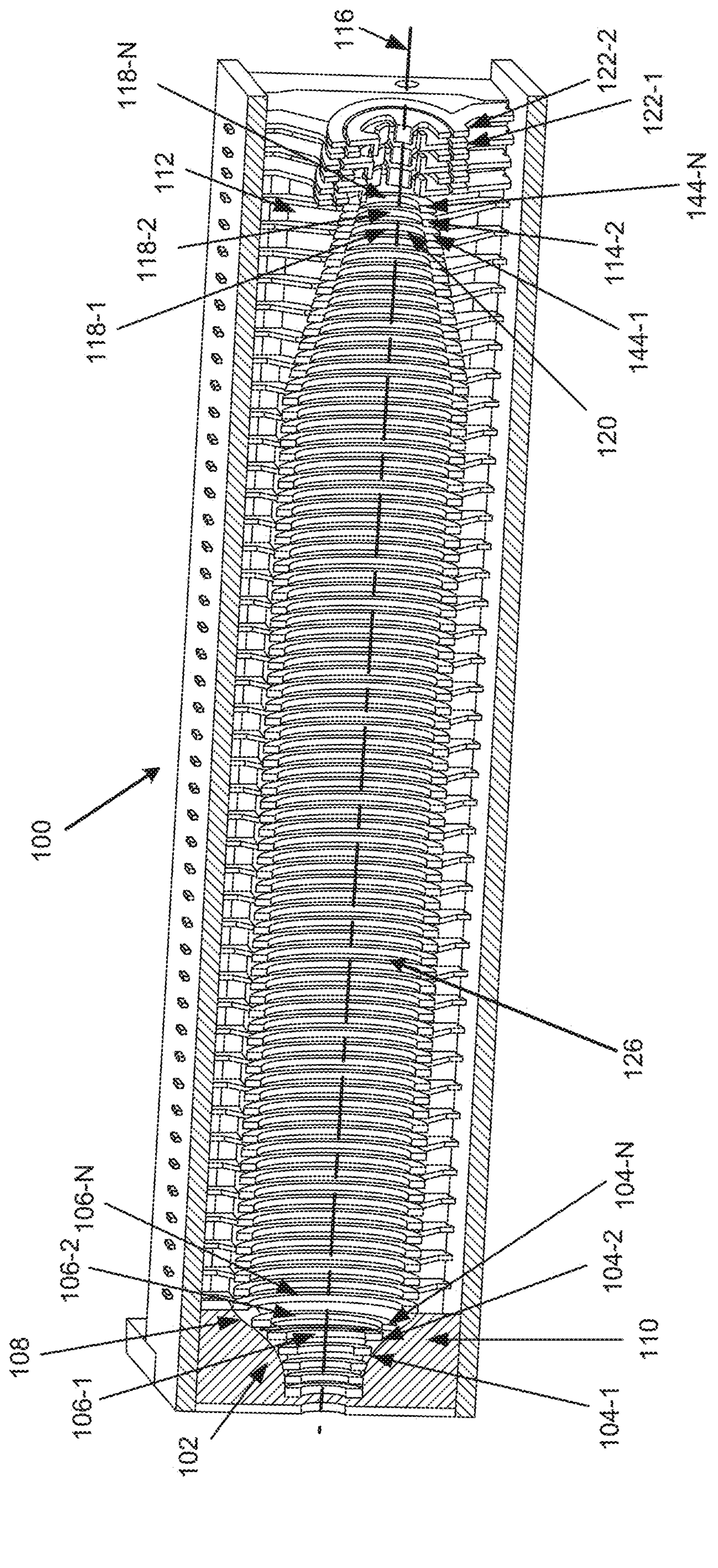
FIG. 1 illustrates an isometric cutout view of an ion funnel-based collision cell, illustrating interior features of the ion funnel-based collision cell, in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, and the term "including" means including but not limited to. The term "based on" means based at least in part on.

With respect to ion funnels, as disclosed herein, in some cases ions may be cooled within an ion funnel by colliding with a background gas such as nitrogen. The background gas may assist in gathering ions with relatively large input energies to deliver ions at an exit with a relatively low energy. Generally, a gas pressure for the background gas may include a range of approximately 1 to 10 Torr. The pressure range may be extended, typically to lower pressures by increasing the RF operating frequency and amplitude, and by crafting the (entrance) exit apertures to appropriate diameters.

While various types of ion funnel implementations may be used for pressures in the 1 to 10 Torr range, the ion funnel operation, including the ion energy cooling aspects, may be operational down to much lower pressures. Ion funnel cooling may be operational as long as the mean free path of ions is equal to or smaller than the ion funnel diameter.

In the pressure range of approximately 3 to 100 milliTorr (mTorr), the ion funnel may be used in place of a multipole collision cell to allow ions entering the collision cell at higher energies (e.g., 5 to 300 eV) to collide with funnel gas, which may cause collision-induced dissociation (CID) fragmentation of the ions and include collection of the fragments. In one type of ion funnel, ions may be either fragmented or separated using a ring structure with RF applied to implement a traveling wave. In another type of ion funnel, static RF voltages may be utilized on the funnel rings. In the other type of ion funnel, the funnel RF frequency and RF amplitude may need to be adjusted to support a desired mass range (e.g., in the range from mass 50 up to masses higher than 10,000).

A collision cell in a mass spectrometer system may enclose a space with higher pressure than other components of the mass spectrometer. In order to keep the ion mean free path relatively long, other regions in the mass spectrometer may be maintained at pressures below 5e-5 Torr. However, in order to obtain sufficient collisional energy for ion fragmentation in a CID cell, the cell pressure may need to be maintained in the 3-100 mTorr range. Since the collision cell has an open entrance and exit, the gas flowing out from the collision cell into the remainder of the mass spectrometer system may add to the gas load pumped by pumps, and is generally desired to be kept at as low pressure as possible. The gas pressure may be kept as low as possible by keeping entrance and exit diameters for the collision cell relatively small (e.g., around 3 mm diameter). At the exit end of the collision cell, the gas departing through an exit aperture may be reduced by reducing the pressure within the collision cell with internal conductance limits. In this regard, it is technically challenging to control the gas that exits from the collision cell through the ion entrance.

In order to address at least the aforementioned technical challenges, an ion funnel-based collision cell is disclosed herein and may include conductance limits at the entrance thereof. In this regard, the conductance limits may be placed over a relatively short distance so the ion collision energy will not be negatively affected. The ion funnel-based collision cell may include an ion funnel utilized as the collision cell. The ion funnel-based collision cell may additionally form a reverse funnel at the entrance to increase the funnel diameter from a small entrance diameter towards the funnel body diameter.

For the ion funnel-based collision cell as disclosed herein, diverging members (e.g., plates) at the entrance may restrict the flow of gas from the body of the ion funnel out through the entrance lens. Yet further, gas flow between a first set of funnel members may be closed by placing an insulating material around an outer diameter of the funnel entrance members to block gas flow between these members. The inclusion of the insulating material may also minimize gas conductance from the funnel body through the entrance lens.

The diameters of the entrance members may also guide ions with initially diverging trajectories to the relatively wider funnel body without significant ion loss. The use of a larger diameter ion funnel body may provide for longer cooling path lengths for ions which may enter the ion funnel at high collision energies (e.g., up to 300 eV). These features may allow a relatively larger entrance diameter, while cooling, fragmenting and collecting fragments with relatively higher overall efficiency over a wide range of energies.

According to examples disclosed herein, the ion funnel-based collision cell may include an ion funnel entrance section formed by a plurality of adjacently disposed entrance members. Each entrance member of at least one pair of the adjacently disposed entrance members may include a successively larger opening to form a tapered or profiled entrance for ions entering the ion funnel-based collision cell. The tapering may provide a cross-sectional diameter that gradually increases or decreases (e.g., linear progression) along a central axis, and the profiling may provide a cross-section of a specified shape (e.g., parabolic, hyperbolic, etc.) along a central axis. An insulation material may be disposed adjacent to or in contact with each entrance member of the at least one pair of the adjacently disposed entrance members to prevent, outside of each successively larger opening, flow of gas between each entrance member of the at least one pair of the adjacently disposed entrance members.

The ion funnel-based collision cell may further include an ion funnel exit section formed by a plurality of adjacently disposed exit members. Each exit member of at least one pair of the adjacently disposed exit members may include a successively smaller opening to form a tapered or profiled exit for ions in the ion funnel-based collision cell. The tapered or profiled exit may be disposed along a central axis of the ion funnel-based collision cell.

According to examples disclosed herein, at least one entrance member of the plurality of the adjacently disposed entrance members may be at least partially formed as a plate.

According to another example, the ion funnel-based collision cell may include an ion funnel entrance section formed by a plurality of adjacently disposed entrance members. Each entrance member of at least one pair of the adjacently disposed entrance members may include a successively larger opening. An insulation barrier (e.g., including the insulation material, or another type of barrier) may be disposed adjacent to or in contact with each entrance member of the at least one pair of the adjacently disposed entrance members to control gas flow in the ion funnel-based collision cell.

As disclosed in detail in co-pending patent application titled "MULTIPOLE SECTION-BASED ION FUNNEL", filed Jul. 29, 2022, the disclosure of which is incorporated by reference in its entirety, the ion funnel-based collision cell, which may be designated as a multipole section-based ion funnel based on the configuration of the entrance, exit, and associated features, may include, at the tapered or profiled exit, at least one pair of adjacently disposed members. A first member of the at least one pair of adjacently disposed members may include a pole structure. Further, a second member of the at least one pair of adjacently disposed members may include a pole structure that is engageable with the pole structure of the first member to form a multipole structure. The pole structure of the first member and the pole structure of the second member may form at least two poles. For example, the pole structure of the first member and the pole structure of the second member may form a quadrupole, a hexapole, etc.

According to examples disclosed herein, the tapered (or profiled) entrance and/or the tapered (or profiled) exit may include a circular cross-section. Alternatively, the tapered (or profiled) entrance and/or the tapered (or profiled) exit may include a non-circular cross-section. In one example, the tapered exit may be radially offset relative to a central axis of the ion funnel-based collision cell. In this regard, one of the exits may be eliminated so that a single exit is radially offset relative to the central axis of the ion funnel-based collision cell.

The ion funnel-based collision cell may further include an ion funnel exit section formed by a plurality of adjacently disposed exit members. Each exit member of at least one pair of the adjacently disposed exit members may include a plurality of successively smaller openings to form a plurality of tapered exits for ions in the ion funnel-based collision cell. The reduced diameter exits may be of the same or different sizes to allow, for example, ions of different sizes to traverse through different sized exits of the ion funnel-based collision cell.

The ion funnel entrance section may be formed by a plurality of adjacently disposed entrance members. Each entrance member of at least one pair of the adjacently disposed entrance members may include a successively larger opening to form a tapered or profiled entrance for ions entering the ion funnel-based collision cell. Further, each entrance member of the at least one pair of the adjacently disposed entrance members may include a specified shape to prevent, outside of each successively larger opening, flow of gas between each entrance member of the at least one pair of the adjacently disposed entrance members. The specified shape may include an orthogonal wall protruding from a flat inner plate (or an angled or chevron stacked ring arrangement to inhibit radial gas expansion in this region). Alternatively, the specified shape may include any other shape to prevent, outside of each successively larger opening, flow of gas between each entrance member of the at least one pair of the adjacently disposed entrance members. In another example, insulating material may be disposed between the adjacently disposed entrance members to prevent flow of gas between each entrance member of the at least one pair of the adjacently disposed entrance members.

The ion funnel-based collision cell may further include an ion funnel exit section formed by a plurality of adjacently disposed exit members. Each exit member of at least one pair of the adjacently disposed exit members may include a successively smaller opening to form a tapered exit for ions in the ion funnel-based collision cell.

Figure 2:
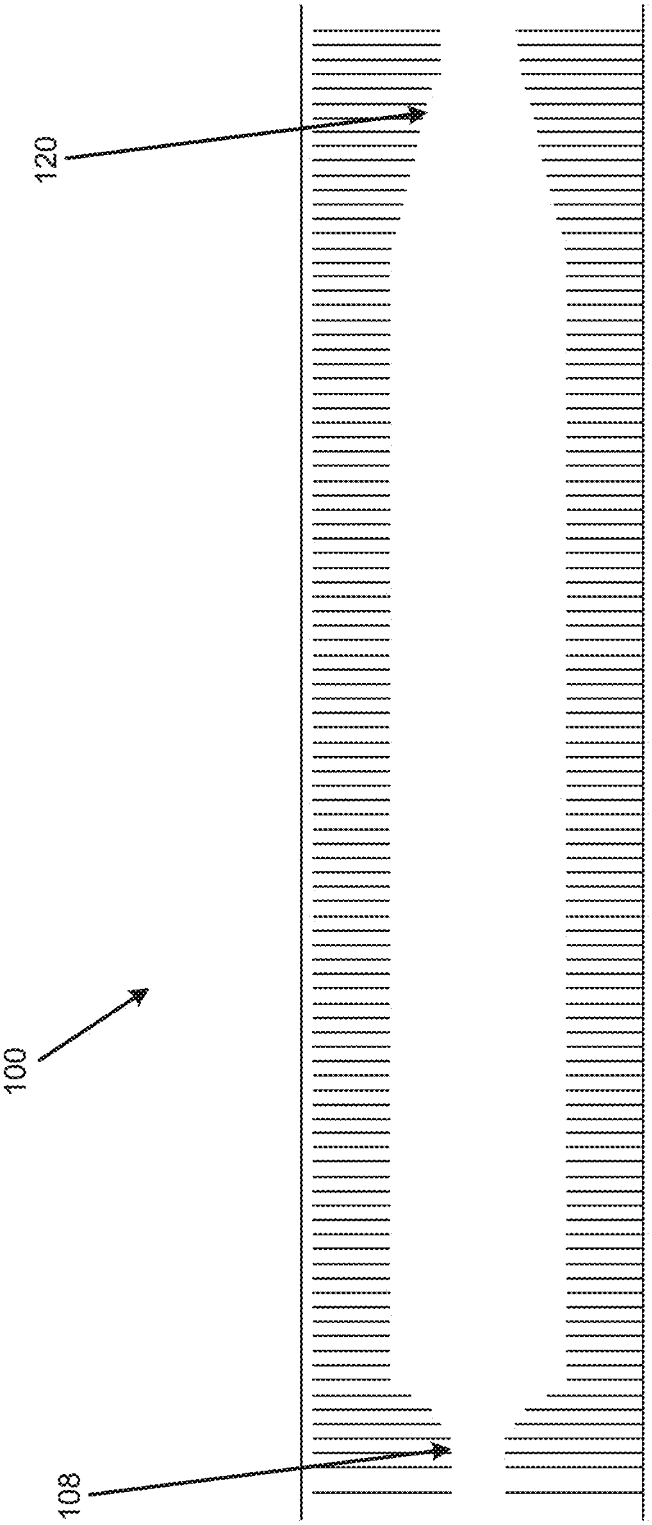
FIG. 2 illustrates a diagrammatic view illustrating a funnel profile of the ion funnel-based collision cell of FIG. 1, in accordance with an example of the present disclosure.

FIG. 1 illustrates an isometric cutout view of an ion funnel-based collision cell 100, illustrating interior features of the ion funnel-based collision cell, in accordance with an example of the present disclosure. FIG. 2 illustrates a diagrammatic view illustrating a funnel profile of the ion funnel-based collision cell 100, in accordance with an example of the present disclosure.

Referring to FIGS. 1 and 2, the ion funnel-based collision cell 100 may include an ion funnel entrance section 102 formed by a plurality of adjacently disposed entrance members 104-1, 104-2, . . . , **104-*n*. Each entrance member of at least one pair of the adjacently disposed entrance members 104-1, 104-2, . . . , 104-*n* may include a successively larger opening 106-1, 106-2, . . . , 106-*n* to form a tapered entrance 108 (or profiled entrance) for ions entering the ion funnel-based collision cell 100. An insulation material 110 may be disposed adjacent to or in contact with each entrance member of the at least one pair of the adjacently disposed entrance members 104-1, 104-2, . . . , 104-*n* to prevent, outside of each successively larger opening, flow of gas between each entrance member of the at least one pair of the adjacently disposed entrance members 104-1, 104-2, . . . , 104-*n***.

In the example of FIG. 1, the insulating material 110 may be placed around an outer diameter of the funnel members to block gas flow between those members. Thus, based on the use of the insulating material 110, the gas conductance from the funnel body through the entrance lens may be further minimized.

As shown in FIG. 1, the diameters of the entrance members may help to guide ions with initially diverging trajectories to the wider funnel body without significant ion loss. The use of a larger diameter funnel body may allow longer cooling path lengths for ions which may enter the funnel at high collision energies (e.g., up to 300 eV). This combination may allow a relatively larger entrance diameter, while cooling, fragmenting and collecting fragments with higher overall efficiency over a wide range of energies.

The ion funnel-based collision cell 100 may further include an ion funnel exit section 112 formed by a plurality of adjacently disposed exit members 114-1, 114-2, . . . , **114-*n*. Each exit member of at least one pair of the adjacently disposed exit members 114-1, 114-2, . . . , 114-*n* may include a successively smaller opening 118-1, 118-2, . . . , 118-*n* to form a tapered exit 120 for ions in the ion funnel-based collision cell 100. The tapered exit 120 may be disposed along a central axis 116 of the ion funnel-based collision cell 100**.

According to examples disclosed herein, at least one entrance member of the plurality of the adjacently disposed entrance members 104-1, 104-2, . . . , **104-*n*** may be at least partially formed as a plate.

According to another example, the ion funnel-based collision cell 100 may include an ion funnel entrance section 102 formed by a plurality of adjacently disposed entrance members 104-1, 104-2, . . . , **104-*n*. Each entrance member of at least one pair of the adjacently disposed entrance members 104-1, 104-2, . . . , 104-*n* may include a successively larger opening 106-1, 106-2, . . . , 106-*n*. An insulation barrier (e.g., including the insulation material 110) may be disposed adjacent to or in contact with each entrance member of the at least one pair of the adjacently disposed entrance members 104-1, 104-2, . . . , 104-*n* to control gas flow in the ion funnel-based collision cell 100**.

As disclosed in detail in co-pending patent application titled "MULTIPOLE SECTION-BASED ION FUNNEL", filed Jul. 29, 2022, the disclosure of which is incorporated by reference in its entirety, the ion funnel-based collision cell 100, which may be designated as a multipole section-based ion funnel based on the configuration of the entrance, exit, and associated features, may include, at the tapered exit 120, at least one pair of adjacently disposed members 122-1, 122-2, etc. In the example of FIG. 1, three pairs of the adjacently disposed members are shown. A first member (e.g., 122-1) of the at least one pair of adjacently disposed members may include a pole structure. Further, a second member (e.g., 122-2) of the at least one pair of adjacently disposed members may include a pole structure that is engageable with the pole structure of the first member to form a multipole structure. The pole structure of the first member 122-1 and the pole structure of the second member 122-2 may form at least two poles. For example, the pole structure of the first member 122-1 and the pole structure of the second member 122-2 may form a quadrupole, a hexapole, etc.

Figure 3:
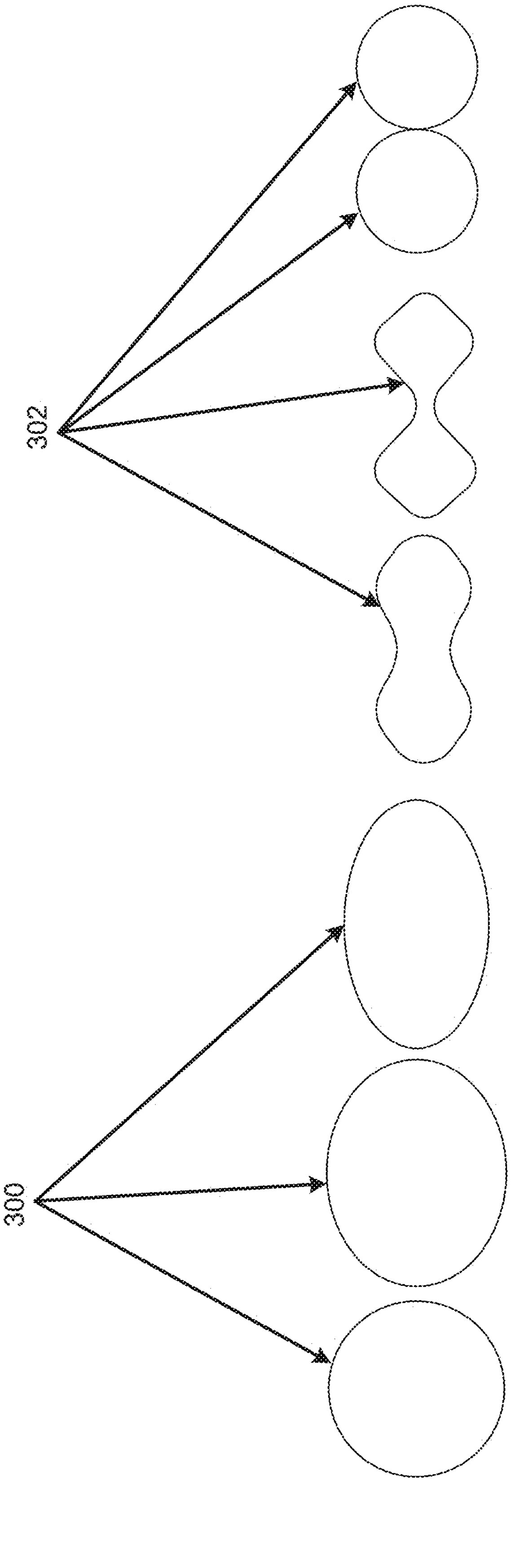
FIG. 3 illustrates examples of exit or internal configurations for the ion funnel-based collision cell of FIG. 1, in accordance with an example of the present disclosure.

FIG. 3 illustrates examples of exit or internal configurations for the ion funnel-based collision cell 100, in accordance with an example of the present disclosure.

Referring to FIG. 3, as shown at 300, various options for internal cross-sections of the ion funnel-based collision cell 100 for a single entrance or exit are shown. At 302, various options for internal cross-sections of the ion funnel-based collision cell 100 for a plurality of entrances or exits are shown. The examples at 300 and 302 may include flat plates (e.g., at 124 in FIG. 1), a mixture of flat plates and one or more pairs of the adjacently disposed members 122-1, 122-2, etc., or just the one or more pairs of the adjacently disposed members 122-1, 122-2, etc.

Figure 4:
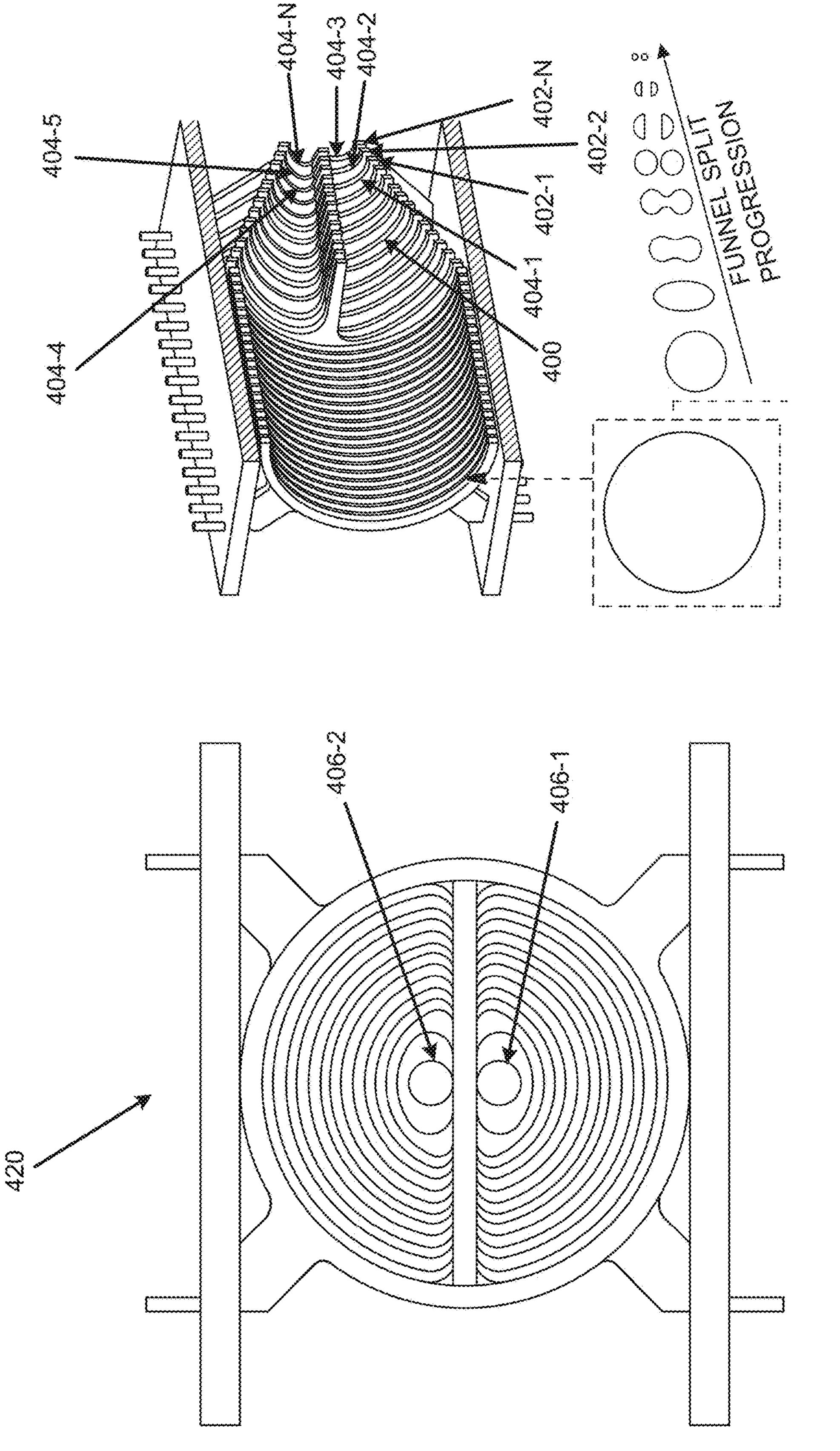
FIG. 4 illustrates various views of an ion funnel-based collision cell including a plurality of exits, in accordance with an example of the present disclosure.

FIG. 4 illustrates various views of an ion funnel-based collision cell 420 including a plurality of exits, in accordance with an example of the present disclosure.

With reference to FIGS. 1 and 4, the tapered entrance 108 and/or the tapered exit 120 may include a circular cross-section. Alternatively, the tapered entrance 108 and/or the tapered exit 120 may include a non-circular cross-section. In one example, the tapered exit may be radially offset (e.g., as shown in FIG. 4 that shows two exits) relative to a central axis 116 of the ion funnel-based collision cell 100. In this regard, one of the exits may be eliminated so that a single exit is radially offset relative to the central axis 116 of the ion funnel-based collision cell 100.

As shown in FIG. 4, the ion funnel-based collision cell 420 may further include an ion funnel exit section 400 formed by a plurality of adjacently disposed exit members 402-1, 402-2, . . . , 402-N. Each exit member of at least one pair of the adjacently disposed exit members 402-1, 402-2, . . . , 402-N may include a plurality of successively smaller openings 404-1, 404-2, 404-3, 404-4, 404-5, . . . , 404-N to form a plurality of tapered exits 406-1 and 406-2 for ions in the ion funnel-based collision cell 420.

Figure 6:
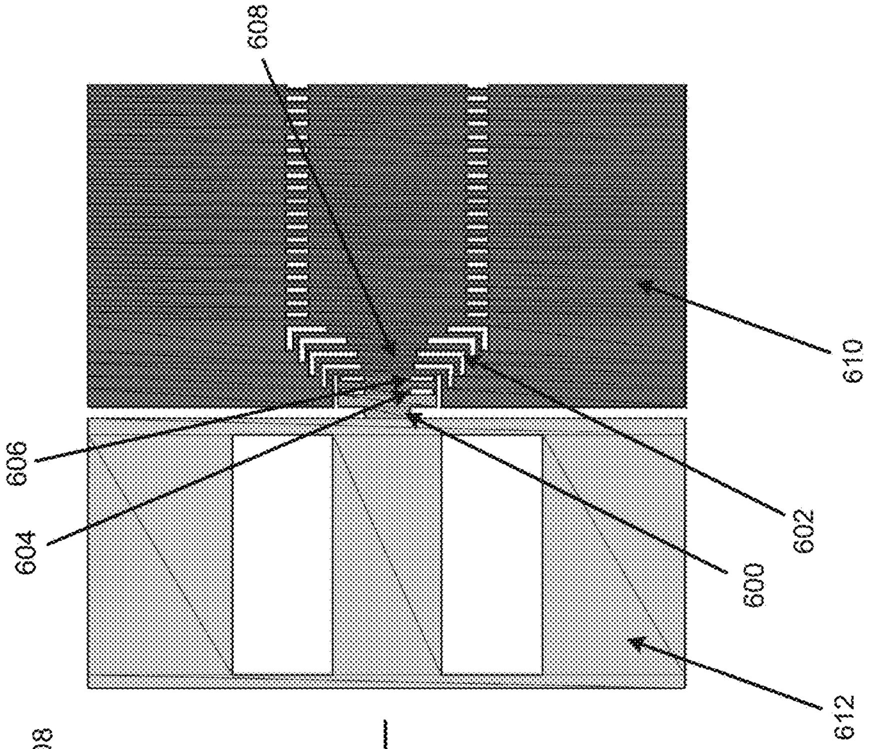
FIG. 6 illustrates vacuum pressure in the internal and external regions of the ion funnel-based collision cell of FIG. 5 using a grey scale to designate the pressure change, in accordance with an example of the present disclosure.
Figure 5:
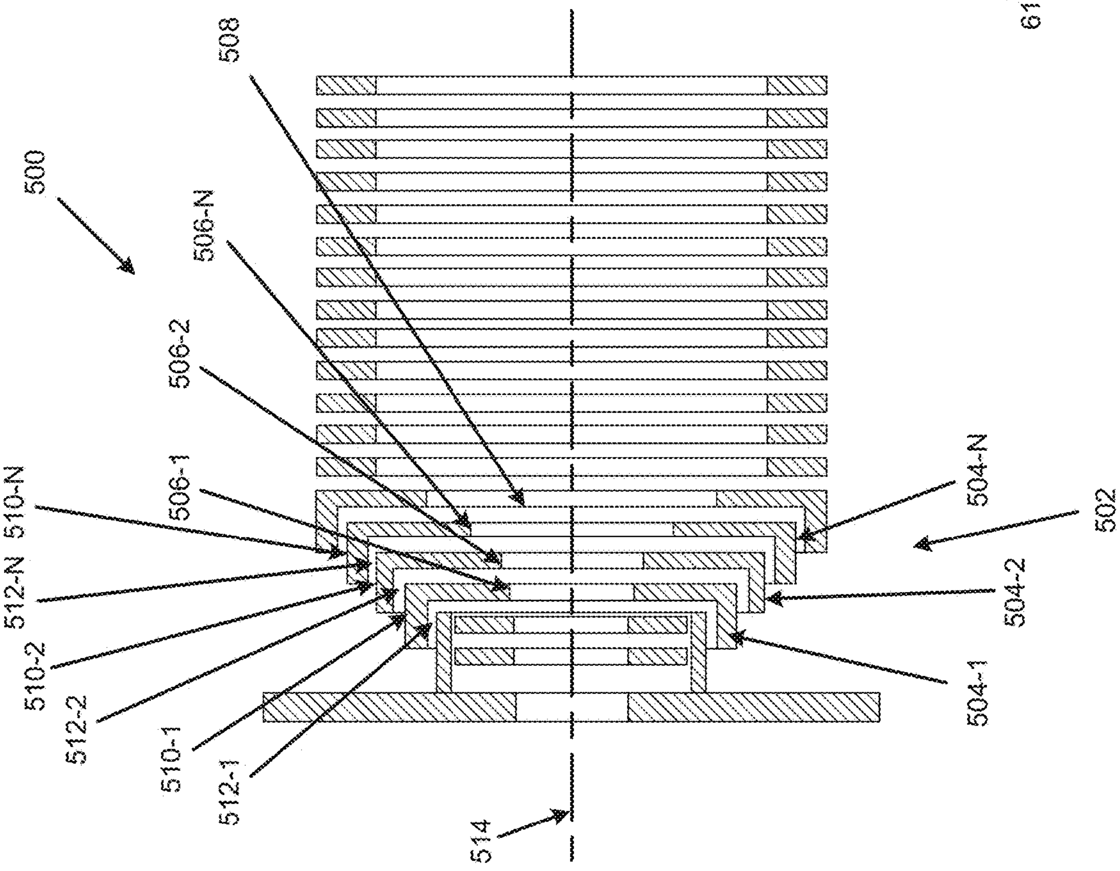
FIG. 5 illustrates a side diagrammatic view of another example of an ion funnel-based collision cell, illustrating interior features of the ion funnel-based collision cell, in accordance with an example of the present disclosure.

FIG. 5 illustrates a side diagrammatic view of another example of an ion funnel-based collision cell 500, illustrating interior features of the ion funnel-based collision cell 500, in accordance with an example of the present disclosure. FIG. 6 illustrates vacuum pressure in the internal and external regions of the ion funnel-based collision cell 500 using a grey scale to designate the pressure change, in accordance with an example of the present disclosure.

With reference to FIGS. 5 and 6, ion funnel entrance section 502 may be formed by a plurality of adjacently disposed entrance members 504-1, 504-2, . . . , 504-N. Each entrance member of at least one pair of the adjacently disposed entrance members 504-1, 504-2, . . . , 504-N may include a successively larger opening 506-1, 506-2, . . . , 506-N to form a tapered entrance 508 (or profiled entrance) for ions entering the ion funnel-based collision cell 500. Further, each entrance member of the at least one pair of the adjacently disposed entrance members 504-1, 504-2, . . . , 504-N may include a specified shape (e.g., at 510-1, 510-2, . . . , 510-N) to prevent, outside (e.g., at 512-1, 512-2, . . . , 512-N) of each successively larger opening 506-1, 506-2, . . . , 506-N, flow of gas between each entrance member of the at least one pair of the adjacently disposed entrance members 504-1, 504-2, . . . , 504-N. In the example of FIG. 5, the specified shape (e.g., at 510-1, 510-2, . . . , 510-N) may include an orthogonal wall protruding from a flat inner plate (or an angled or chevron stacked ring arrangement to inhibit radial gas expansion in this region).

Generally, the ion funnel-based collision cell 500 may not be restricted to designs with cylindrical symmetry but may have virtually any inside shape, including shapes with multiple entrances and/or exits, or where funnel channel 126 follows arbitrary nonlinear paths. The insulating conductance limits imposed by the insulation material 110 may be replaced with or augmented with shaped metal members as shown. The replacement of the insulation material 110 with the shaped metal members may reduce the risks of charging (e.g., charges built up on the dielectric surface)

With continued reference to FIGS. 5 and 6, gas flow in the ion funnel-based collision cell 500 is shown at 600. In this regard, gas may flow between wall 602 and members 604 and 606. However, due to the orthogonal walls at 510-1, 510-2, . . . , 510-N, gas flow may be restricted to internal area 608 of the ion funnel-based collision cell 500. The gas pressure may be relatively high at 610 (e.g., mTorr range), and relatively low at 612 (e.g., 1e-5 Torr range). At relatively low pressures and small spaces, the flow may include a molecular flow characteristic. In this regard, most gas molecules may travel in straight lines from one surface to the next surface with relatively few gas-gas collisions, which may tend to reduce the effective conductance compared to higher pressure flow.

With reference to FIGS. 1 and 5, the ion funnel-based collision cell 500 may further include an ion funnel exit section 112 (e.g., as shown in FIG. 1) formed by a plurality of adjacently disposed exit members. Each exit member of at least one pair of the adjacently disposed exit members 114-1, 114-2, . . . , 114-*n* may include a successively smaller opening 118-1, 118-2, . . . , 118-*n* to form a tapered exit 120 for ions in the ion funnel-based collision cell 500.

In one example, the tapered entrance 508 and/or the tapered exit 120 may include a circular cross-section (e.g., see FIGS. 1 and 3). In another example, the tapered entrance 508 and/or the tapered exit 120 may include a non-circular cross-section (e.g., see FIGS. 1 and 3).

In one example, the tapered exit may be radially offset (e.g., in a similar manner as shown in FIG. 4 that shows two exits) relative to central axis 514 of the ion funnel-based collision cell 500. In this regard, one of the exits may be eliminated so that a single exit is radially offset relative to the central axis 514 of the ion funnel-based collision cell 500.

With reference to FIGS. 4 and 5, the ion funnel-based collision cell 500 may further include an ion funnel exit section 400 (e.g., in a similar manner as shown in FIG. 4) formed by a plurality of adjacently disposed exit members 402-1, 402-2, . . . , 402-N. Each exit member of at least one pair of the adjacently disposed exit members 402-1, 402-2, . . . , 402-N may include a plurality of successively smaller openings 404-1, 404-2, 404-3, 404-4, 404-5, . . . , 404-N to form a plurality of tapered exits 406-1, 406-2 for ions in the ion funnel-based collision cell 500.

Figure 7:
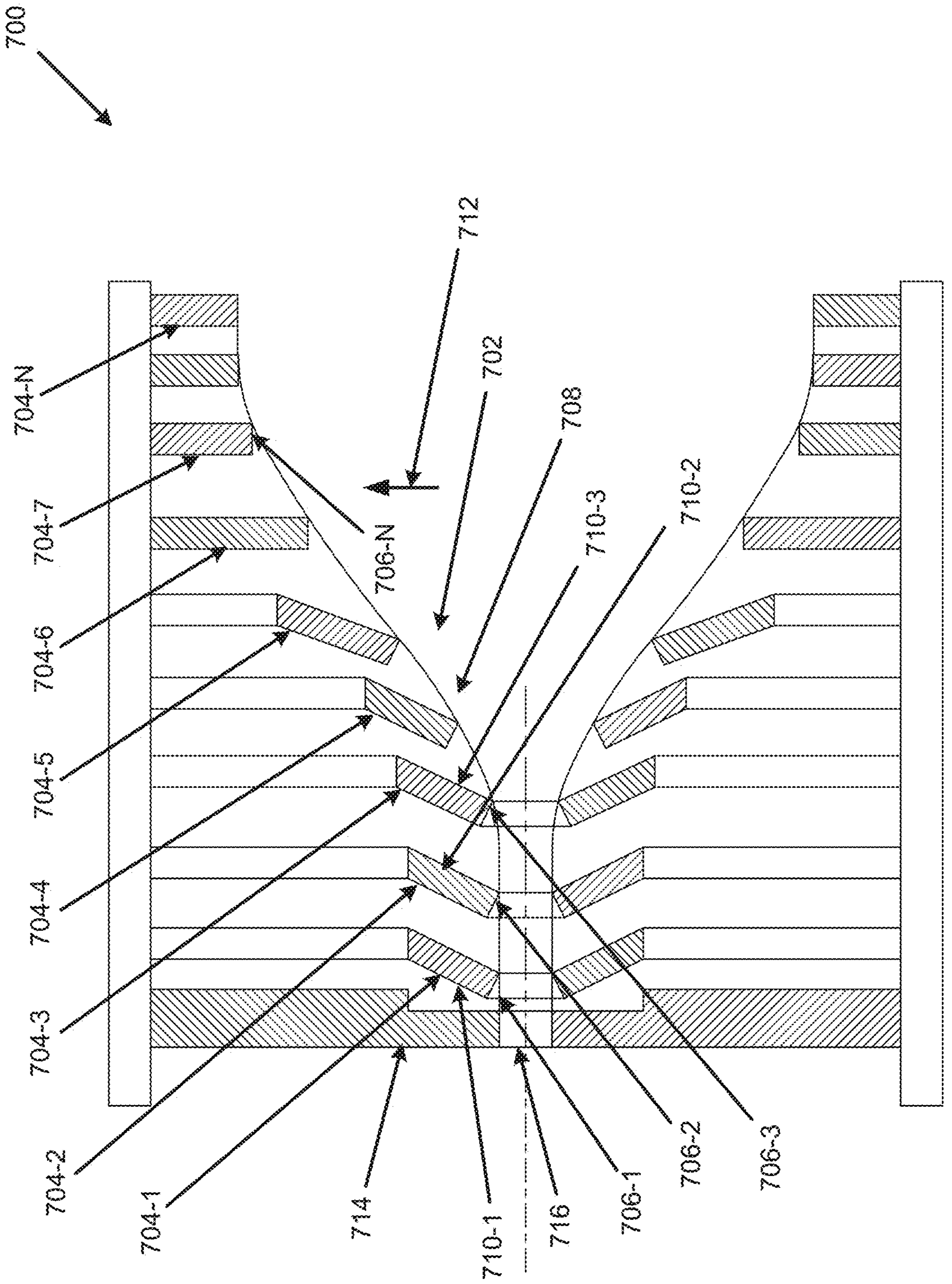
FIG. 7 illustrates a side diagrammatic view of another example of an ion funnel-based collision cell, illustrating interior features of the ion funnel-based collision cell to provide a profiled entrance and a gas restriction, in accordance with an example of the present disclosure.

FIG. 7 illustrates a side diagrammatic view of another example of an ion funnel-based collision cell 700, illustrating interior features of the ion funnel-based collision cell to provide a profiled entrance and a gas restriction, in accordance with an example of the present disclosure.

With reference to FIG. 7, ion funnel entrance section 702 may be formed by a plurality of adjacently disposed entrance members 704-1, 704-2, . . . , 704-N. Each entrance member of the adjacently disposed entrance members 704-1, 704-2, . . . , 704-7 may include a successively larger opening from 706-1 towards 706-N to form a profiled entrance 708 for ions entering the ion funnel-based collision cell 700. Further, each entrance member of the adjacently disposed entrance members 704-1, 704-2, . . . , 704-N may include a specified shape as shown to prevent flow of gas between each entrance member of the adjacently disposed entrance members 704-1, 704-2, . . . , 704-N. In the example of FIG. 7, the specified shape (e.g., at 710-1, 710-2, . . . , 710-3, etc.) may include an angled or chevron stacked entrance member arrangement to inhibit radial gas expansion. For example, the angle at 710-1, etc., may be oriented towards the entrance (e.g., left side of FIG. 7, in the orientation of FIG. 7) of the ion funnel-based collision cell 700. The geometry of the entrance members may be used to aid forward motion of ions by acceleration, or retard motion of ions by deceleration. For example, the geometry at 710-1, etc., may provide a pushing (e.g., acceleration) field to aid forward motion of ions. The geometry of the entrance members 704-1, 704-2, . . . , 704-N may also provide radial gas flow restriction for gas flowing in the direction represent by arrow 712. Further, a lens element 714 may be provided to form an entrance orifice 716 as shown.

Figure 8:
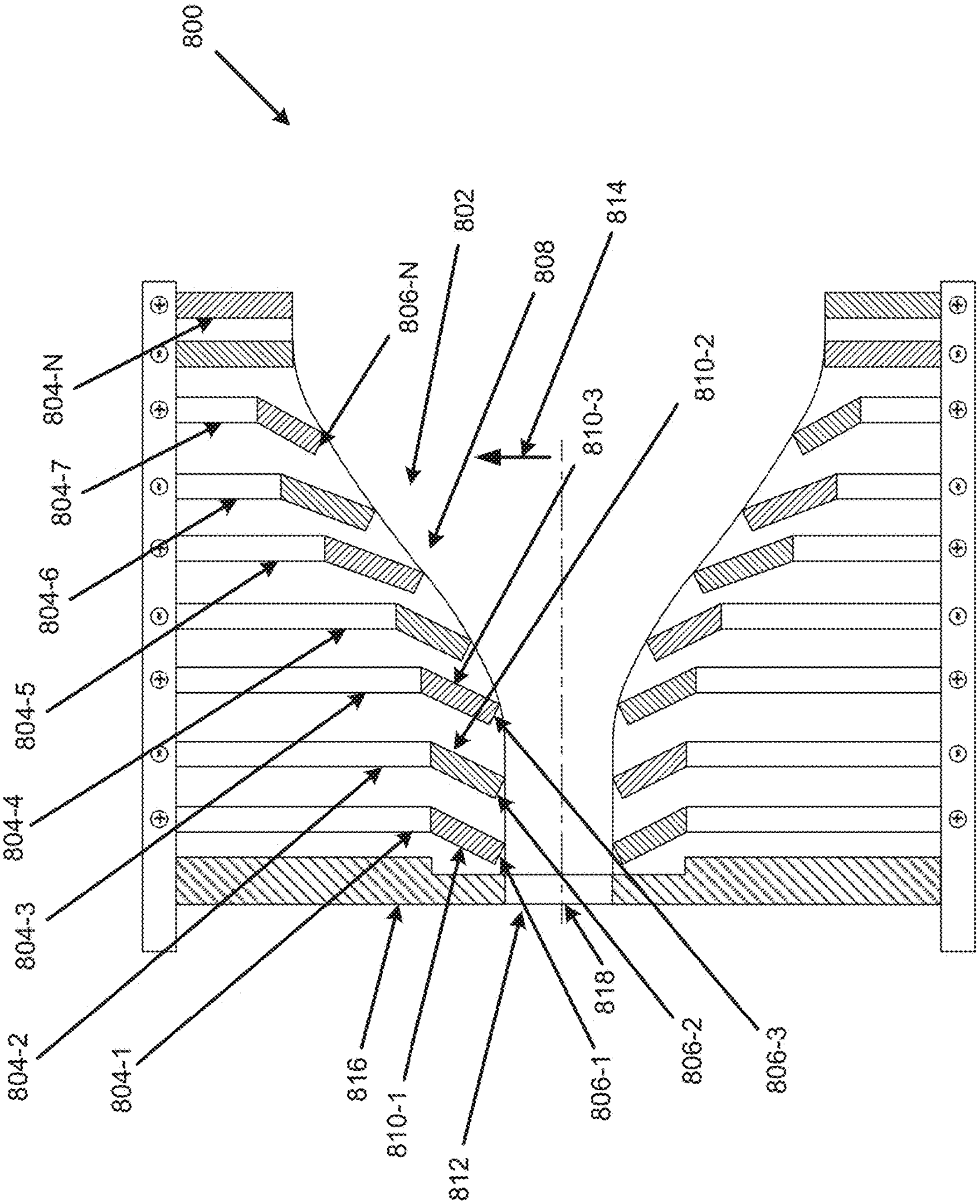
FIG. 8 illustrates a side diagrammatic view of another example of an ion funnel-based collision cell, illustrating interior features of the ion funnel-based collision cell to provide a profiled entrance and a gas restriction, in accordance with an example of the present disclosure.

FIG. 8 illustrates a side diagrammatic view of another example of an ion funnel-based collision cell 800, illustrating interior features of the ion funnel-based collision cell to provide a profiled entrance and a gas restriction, in accordance with an example of the present disclosure.

With reference to FIG. 8, ion funnel entrance section 802 may be formed by a plurality of adjacently disposed entrance members 804-1, 804-2, . . . , 804-N. Each entrance member of the adjacently disposed entrance members 804-1, 804-2, . . . , 804-8 may include a successively larger opening from 806-1 towards 806-N to form a profiled entrance 808 for ions entering the ion funnel-based collision cell 800. Further, each entrance member of the adjacently disposed entrance members 804-1, 804-2, . . . , 804-N may include a specified shape as shown to prevent flow of gas between each entrance member of the adjacently disposed entrance members 804-1, 804-2, . . . , 804-N. In the example of FIG. 8, the specified shape (e.g., at 810-1, 810-2, . . . , 810-3, etc.) may include an angled or chevron stacked entrance member arrangement to inhibit radial gas expansion. For example, the angle at 810-1, etc., may be oriented towards the entrance (e.g., left side of FIG. 8, in the orientation of FIG. 8) of the ion funnel-based collision cell 800. Compared to the ion funnel-based collision cell 700 of FIG. 7, the ion funnel-based collision cell 800 may include a larger diameter entrance at 812. The geometry of the entrance members may be used to aid forward motion of ions by acceleration, or retard motion of ions by deceleration. For example, the geometry at 810-1, etc., may provide a pushing (e.g., acceleration) field to aid forward motion of ions. The geometry of the entrance members 804-1, 804-2, . . . , 804-N may also provide radial gas flow restriction for gas flowing in the direction represent by arrow 814. Further, a lens element 816 may be provided to form an entrance orifice 818 as shown.

Figure 9:
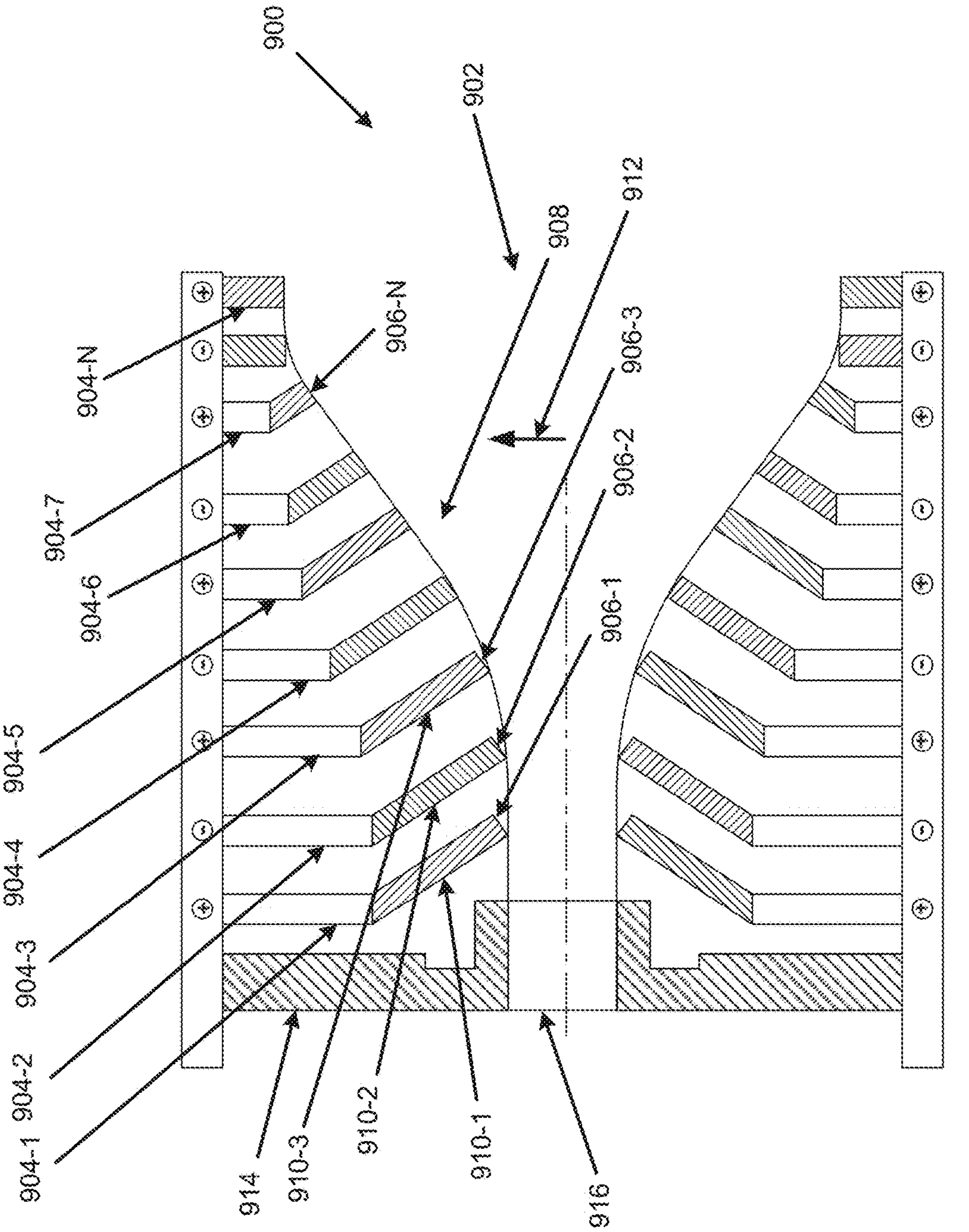
FIG. 9 illustrates a side diagrammatic view of another example of an ion funnel-based collision cell, illustrating interior features of the ion funnel-based collision cell to provide a profiled entrance and a gas restriction, in accordance with an example of the present disclosure.

FIG. 9 illustrates a side diagrammatic view of another example of an ion funnel-based collision cell 900, illustrating interior features of the ion funnel-based collision cell to provide a profiled entrance and a gas restriction, in accordance with an example of the present disclosure.

With reference to FIG. 9, ion funnel entrance section 902 may be formed by a plurality of adjacently disposed entrance members 904-1, 904-2, . . . , 904-N. Each entrance member of the adjacently disposed entrance members 904-1, 904-2, . . . , 904-9 may include a successively larger opening from 906-1 towards 906-N to form a profiled entrance 908 for ions entering the ion funnel-based collision cell 900. Further, each entrance member of the adjacently disposed entrance members 904-1, 904-2, . . . , 904-N may include a specified shape as shown to prevent flow of gas between each entrance member of the adjacently disposed entrance members 904-1, 904-2, . . . , 904-N. In the example of FIG. 9, the specified shape (e.g., at 910-1, 910-2, . . . , 910-3, etc.) may include an angled or chevron stacked entrance member arrangement to inhibit radial gas expansion. For example, the angle at 910-1, etc., may be oriented away from the entrance (e.g., left side of FIG. 9, in the orientation of FIG. 9) of the ion funnel-based collision cell 900. The geometry of the entrance members may be used to aid forward motion of ions by acceleration, or retard motion of ions by deceleration. For example, the geometry at 910-1, etc., may provide a stopping (e.g., deceleration) field to retard motion of ions. The geometry of the entrance members 904-1, 904-2, . . . , 904-N may also provide radial gas flow restriction for gas flowing in the direction represent by arrow 912. Further, a lens element 914 may be provided to form an entrance orifice 916 as shown.

Figure 10:
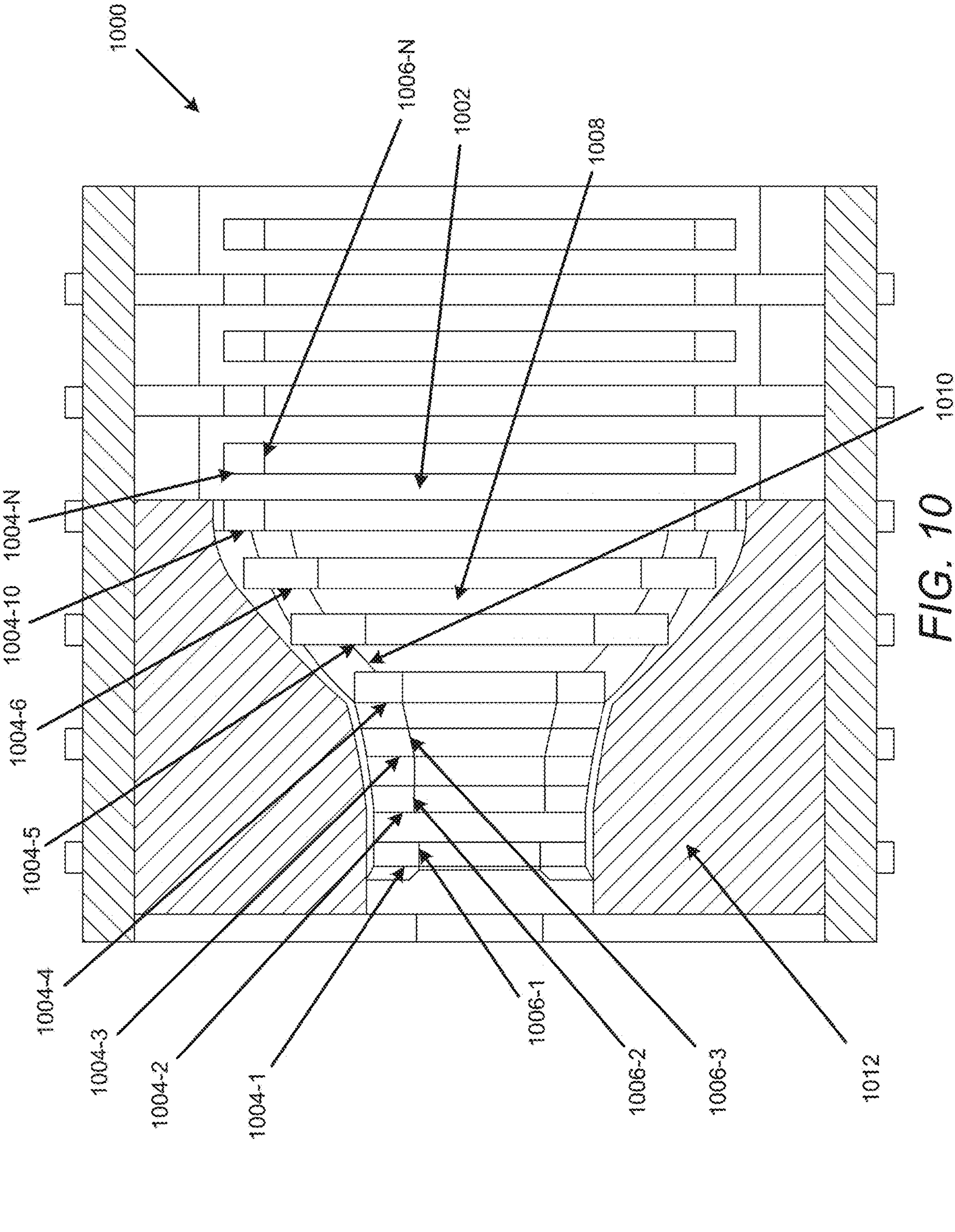
FIG. 10 illustrates a side diagrammatic view of another example of an ion funnel-based collision cell, illustrating interior features of the ion funnel-based collision cell to provide a profiled entrance and a gas restriction, in accordance with an example of the present disclosure.

FIG. 10 illustrates a side diagrammatic view of another example of an ion funnel-based collision cell, illustrating interior features of the ion funnel-based collision cell to provide a profiled entrance and a gas restriction, in accordance with an example of the present disclosure.

With reference to FIG. 10, ion funnel entrance section 1002 may be formed by a plurality of adjacently disposed entrance members 1004-1, 1004-2, . . . , 1004-N. Each entrance member of the adjacently disposed entrance members 1004-1, 1004-2, . . . , 1004-10 may include a successively larger opening from 1006-1 towards 1006-N to form a profiled entrance 1008 for ions entering the ion funnel-based collision cell 1000. The profiled entrance 1008 may be described as a profiled taper (e.g., an irregular non-linear taper), with openings at different angles as shown at 1006-1, 1010, etc. Further, an insulation material 1012 may be utilized to inhibit radial gas expansion.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An ion funnel-based collision cell comprising:

an ion funnel entrance section formed by a plurality of adjacently disposed entrance members, wherein each entrance member of at least one pair of the adjacently disposed entrance members includes a successively larger opening to form a tapered or profiled entrance for ions entering the ion funnel-based collision cell; and an insulation material disposed adjacent to or in contact with each entrance member of the at least one pair of the adjacently disposed entrance members to prevent, outside of each successively larger opening, flow of gas between each entrance member of the at least one pair of the adjacently disposed entrance members.

2. The ion funnel-based collision cell according to claim 1, further comprising:

an ion funnel exit section formed by a plurality of adjacently disposed exit members, wherein each exit member of at least one pair of the adjacently disposed exit members includes a successively smaller opening to form a tapered or profiled exit for ions in the ion funnel-based collision cell.

3. The ion funnel-based collision cell according to claim 2, wherein at least one of the tapered or profiled entrance, or the tapered or profiled exit includes a circular cross-section.

4. The ion funnel-based collision cell according to claim 2, wherein at least one of the tapered or profiled entrance, or the tapered or profiled exit includes a non-circular cross-section.

5. The ion funnel-based collision cell according to claim 2, wherein the tapered or profiled exit is disposed along a central axis of the ion funnel-based collision cell.

6. The ion funnel-based collision cell according to claim 2, wherein the tapered or profiled exit is radially offset relative to a central axis of the ion funnel-based collision cell.

7. The ion funnel-based collision cell according to claim 1, further comprising:

an ion funnel exit section formed by a plurality of adjacently disposed exit members, wherein each exit member of at least one pair of the adjacently disposed exit members includes a plurality of successively smaller openings to form a plurality of tapered or profiled exits for ions in the ion funnel-based collision cell.

8. The ion funnel-based collision cell according to claim 1, wherein at least one entrance member of the plurality of the adjacently disposed entrance members is at least partially formed as a plate.

9. An ion funnel-based collision cell comprising:

an ion funnel entrance section formed by a plurality of adjacently disposed entrance members, wherein each entrance member of at least one pair of the adjacently disposed entrance members includes a successively larger opening to form a tapered or profiled entrance for ions entering the ion funnel-based collision cell, and wherein each entrance member of the at least one pair of the adjacently disposed entrance members includes a specified shape to prevent, outside of each successively larger opening, flow of gas between each entrance member of the at least one pair of the adjacently disposed entrance members.

10. The ion funnel-based collision cell according to claim 9, wherein the specified shape includes an orthogonal wall protruding from a flat inner plate.

11. The ion funnel-based collision cell according to claim 9, wherein the specified shape includes an angled wall to inhibit radial gas expansion.

12. The ion funnel-based collision cell according to claim 9, further comprising:

an ion funnel exit section formed by a plurality of adjacently disposed exit members, wherein each exit member of at least one pair of the adjacently disposed exit members includes a successively smaller opening to form a tapered or profiled exit for ions in the ion funnel-based collision cell.

13. The ion funnel-based collision cell according to claim 12, wherein at least one of the tapered or profiled entrance or the tapered or profiled exit includes a circular cross-section.

14. The ion funnel-based collision cell according to claim 12, wherein at least one of the tapered or profiled entrance, or the tapered or profiled exit includes a non-circular cross-section.

15. The ion funnel-based collision cell according to claim 12, wherein the tapered or profiled exit is disposed along a central axis of the ion funnel-based collision cell.

16. The ion funnel-based collision cell according to claim 12, wherein the tapered or profiled exit is radially offset relative to a central axis of the ion funnel-based collision cell.

17. The ion funnel-based collision cell according to claim 9, further comprising:

an ion funnel exit section formed by a plurality of adjacently disposed exit members, wherein each exit member of at least one pair of the adjacently disposed exit members includes a plurality of successively smaller openings to form a plurality of tapered or profiled exits for ions in the ion funnel-based collision cell.

18. An ion funnel-based collision cell comprising:

an ion funnel entrance section formed by a plurality of adjacently disposed entrance members, wherein each entrance member of at least one pair of the adjacently disposed entrance members includes a successively larger opening; and an insulation barrier disposed adjacent to or in contact with each entrance member of the at least one pair of the adjacently disposed entrance members to control gas flow in the ion funnel-based collision cell.

19. The ion funnel-based collision cell according to claim 18, further comprising:

an ion funnel exit section formed by a plurality of adjacently disposed exit members, wherein each exit member of at least one pair of the adjacently disposed exit members includes a successively smaller opening.

20. The ion funnel-based collision cell according to claim 18, further comprising:

an ion funnel exit section formed by a plurality of adjacently disposed exit members, wherein each exit member of at least one pair of the adjacently disposed exit members includes a plurality of successively smaller openings.

* * * * *